(12) United States Patent
Jia et al.

(10) Patent No.: US 11,341,883 B2
(45) Date of Patent: May 24, 2022

(54) DISPLAY DEVICE AND METHOD FOR ADJUSTING ITS DISPLAY BRIGHTNESS

(71) Applicant: BOE TECHNOLOGY GROUP CO., LTD., Beijing (CN)

(72) Inventors: Yanan Jia, Beijing (CN); Xue Dong, Beijing (CN); Jing Lv, Beijing (CN); Haisheng Wang, Beijing (CN); Chun Wei Wu, Beijing (CN); Yingming Liu, Beijing (CN); Xueyou Cao, Beijing (CN); Rui Xu, Beijing (CN); Changfeng Li, Beijing (CN); Lijun Zhao, Beijing (CN); Yanling Han, Beijing (CN); Yuzhen Guo, Beijing (CN); Pinchao Gu, Beijing (CN); Yunke Qin, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 693 days.

(21) Appl. No.: 16/316,188

(22) PCT Filed: Jan. 31, 2018

(86) PCT No.: PCT/CN2018/074784
§ 371 (c)(1),
(2) Date: Jan. 8, 2019

(87) PCT Pub. No.: WO2019/015299
PCT Pub. Date: Jan. 24, 2019

(65) Prior Publication Data
US 2021/0335173 A1 Oct. 28, 2021

(30) Foreign Application Priority Data

Jul. 17, 2017 (CN) .......................... 201710582258.0

(51) Int. Cl.
*G09G 5/00* (2006.01)
*G09G 3/20* (2006.01)
*C09K 19/26* (2006.01)

(52) U.S. Cl.
CPC ............... *G09G 3/20* (2013.01); *C09K 19/26* (2013.01); *G09G 2320/0626* (2013.01); *G09G 2360/144* (2013.01)

(58) Field of Classification Search
CPC ............ G09G 3/20; G09G 2320/0626; G09G 2360/144; C09K 19/26
See application file for complete search history.

(56) References Cited

U.S. PATENT DOCUMENTS

2004/0053354 A1 3/2004 Ikawa et al.
2012/0194563 A1 8/2012 Liang et al.
(Continued)

FOREIGN PATENT DOCUMENTS

CN 102722022 A 10/2012
CN 103105680 A 5/2013
(Continued)

OTHER PUBLICATIONS

International Search Report and Written Opinion dated May 4, 2018.

*Primary Examiner* — Adam R. Giesy
(74) *Attorney, Agent, or Firm* — Dilworth & Barrese, LLP.; Michael J. Musella, Esq.

(57) ABSTRACT

Disclosed are a display device and a method for adjusting its display brightness. The display device includes a display screen and an ambient light sensor in the display screen, wherein the ambient light sensor includes a photodeformable element, and the photodeformable element includes a photodeformable material layer; and the photodeformable element is configured to deform in response to a change in ambient light to obtain output of the ambient light sensor.

(Continued)

The ambient light sensor has a simple structure and is easy to be made and to be combined with the display screen.

17 Claims, 3 Drawing Sheets

(56) References Cited

U.S. PATENT DOCUMENTS

| | | | |
|---|---|---|---|
| 2013/0222354 | A1 | 8/2013 | Koivunen |
| 2018/0033356 | A1* | 2/2018 | Zhou ................ G09G 3/007 |
| 2018/0239214 | A1 | 8/2018 | Ji et al. |

FOREIGN PATENT DOCUMENTS

| | | |
|---|---|---|
| CN | 103189908 A | 7/2013 |
| CN | 105974656 A | 9/2016 |
| CN | 107316624 A | 11/2017 |

* cited by examiner

DISPLAY DEVICE AND METHOD FOR ADJUSTING ITS DISPLAY BRIGHTNESS

The present application claims the priority of the Chinese Patent Application No. 201710582258.0 filed on Jul. 17, 2017, which is incorporated herein by reference as part of the disclosure of the present application.

TECHNICAL FIELD

Embodiments of the present disclosure relate to a display device and a method for adjusting display brightness of the display device.

BACKGROUND

With the development of display technology, a display device is more and more widely used in our life. Under different ambient light conditions, the sensitivity of our eyes to the brightness of display devices is varied. It is necessary to adjust the brightness of the display device according to the brightness of ambient light, so as to relieve the user's eye fatigue. For example, when the brightness of ambient light is high, it is necessary to increase the brightness of the display device to make it more clearly visible to the eyes. Conversely, when the brightness of the ambient light is low, the brightness of the display device needs to be lowered to avoid the brightness of the display device being too high to give a glare.

SUMMARY

At least one embodiment of the present disclosure provides a display device, and the display device comprises: a display screen; and an ambient light sensor in the display screen; wherein the ambient light sensor comprises a photodeformable element, and the photodeformable element comprises a photodeformable material layer; the photodeformable element is configured to deform in response to a change in ambient light to obtain output of the ambient light sensor.

For example, in the display device provided by at least one embodiment of the present disclosure, the photodeformable element further comprises a conducting layer which is configured to transmit an electrical signal, and the photodeformable element is a laminate of the conducting layer and the photodeformable material layer.

For example, in the display device provided by at least one embodiment of the present disclosure, the display device is configured to adjust display brightness of the display screen according to the output of the ambient light sensor.

For example, the display device provided by at least one embodiment of the present disclosure further comprises a driving signal circuit and a metal wire, wherein one end of the photodeformable element is connected with the driving signal circuit, and the other end of the photodeformable element is deformed to electrically connect or disconnect with the metal wire in response to a change in ambient light.

For example, in the display device provided by at least one embodiment of the present disclosure, the photodeformable element is electrically connected with the metal wire in a case that the photodeformable element senses the ambient light and deforms, or the photodeformable element is disconnected with the metal wire in a case that the photodeformable element senses the ambient light and deforms.

For example, the display device provided by at least one embodiment of the present disclosure further comprises a signal acquisition circuit, wherein the signal acquisition circuit is connected with the metal wire, and is configured to acquire information outputted from the ambient light sensor.

For example, the display device provided by at least one embodiment of the present disclosure further comprises a controller, wherein the controller is configured to receive the information outputted from the ambient light sensor and to control display brightness of the display screen.

For example, in the display device provided by at least one embodiment of the present disclosure, the controller is configured to adjust the display brightness of the display screen according to a piecewise function.

For example, in the display device provided by at least one embodiment of the present disclosure, the display screen comprises a first substrate and a second substrate, and both the ambient light sensor and the metal wire are arranged on the first substrate or the second substrate; or one of the ambient light sensor and the metal wire is arranged on the first substrate and the other is arranged on the second substrate.

For example, in the display device provided by at least one embodiment of the present disclosure, the photodeformable element is deformed in response to at least one of ultraviolet light, visible light and infrared light.

For example, in the display device provided by at least one embodiment of the present disclosure, the photodeformable element is sensitive to ultraviolet light, and the photodeformable material layer comprises a photodeformable liquid crystal elastomer having an azobenzene photoresponsive group.

For example, in the display device provided by at least one embodiment of the present disclosure, the photodeformable element is sensitive to visible light, and the photodeformable material layer comprises a liquid crystal polymer having an azotolane long conjugated group.

For example, in the display device provided by at least one embodiment of the present disclosure, the photodeformable element is sensitive to infrared light, and the photodeformable material layer comprises a composite material of an azobenzene liquid crystal polymer and rare earth luminescent nanoparticles.

At least one embodiment of the present disclosure further provides a method for adjusting display brightness of a display device, and the method comprises: sensing ambient light by a photodeformable element in an ambient light sensor, wherein the photodeformable element has a photodeformable material layer which is deformed in response to a change in ambient light to obtain output of the ambient light sensor; and adjusting display brightness of a display screen in the display device according to the output of the ambient light sensor.

For example, in the method provided by at least one embodiment of the present disclosure, the photodeformable element further comprises a conducting layer which is laminated and connected with the photodeformable material layer, and deformation of the photodeformable material layer causes deformation of the conducting layer so that the output of the ambient light sensor is obtained.

For example, in the method provided by at least one embodiment of the present disclosure, the display device further comprises a driving signal circuit and a metal wire; and one end of the photodeformable element is fixedly connected to the driving signal circuit, and the other end of the photodeformable element is deformed in response to a change in ambient light to electrically connect or disconnect with the metal wire for obtaining the output of the ambient light sensor.

For example, the method provided by at least one embodiment of the present disclosure, the photodeformable element is electrically connected with the metal wire in a case that the photodeformable element senses the ambient light and deforms, or the photodeformable element is disconnected with the metal wire in a case that the photodeformable element senses the ambient light and deforms.

BRIEF DESCRIPTION OF THE DRAWINGS

In order to clearly illustrate the technical solution of the embodiments of the present disclosure, the drawings of the embodiments will be briefly described. It is apparent that the described drawings are only related to some embodiments of the present disclosure and thus are not limitative of the present disclosure.

REFERENCE NUMERALS

Figure 1:
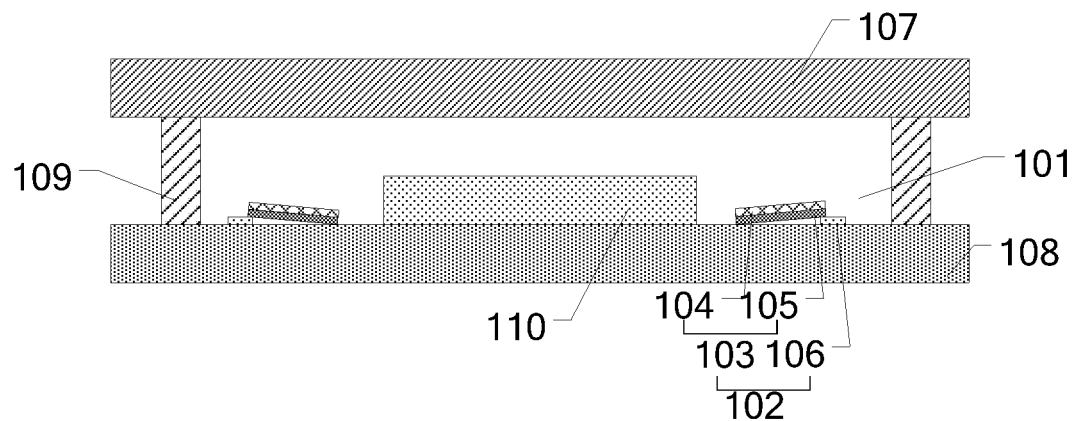
FIG. 1 is a schematic diagram of a structure of a display device in a first state provided by an embodiment of the present disclosure.

101—display screen; 102—ambient light sensor; 103—photodeformable element; 104—photodeformable material layer; 105—conducting layer; 106—metal wire; 107—first substrate; 108—second substrate; 109—encapsulation element; 110—display element.

DETAILED DESCRIPTION

In order to make objects, technical details and advantages of embodiments of the disclosure clear, the technical solutions of the embodiments will be described in a clearly and fully understandable way in connection with the related drawings. It is apparent that the described embodiments are just a part but not all of the embodiments of the disclosure. Based on the described embodiments herein, those skilled in the art can obtain, without any inventive work, other embodiment(s) which should be within the scope of the disclosure.

Unless otherwise defined, all the technical and scientific terms used herein have the same meanings as commonly understood by one of ordinary skill in the art to which the present invention belongs. The terms "first," "second," etc., which are used in the description and claims of the present application, are not intended to indicate any sequence, amount or importance, but distinguish various components. The terms "comprises," "comprising," "includes," "including," etc., are intended to specify that the elements or the objects stated before these terms encompass the elements or the objects listed after these terms as well as equivalents thereof, but do not exclude other elements or objects. The phrases "connect", "connected", etc., are not intended to define a physical connection or mechanical connection, but may comprise an electrical connection which is direct or indirect. The terms "on," "under," "right," "left" and the like are only used to indicate relative position relationship, and in the case that the position of an object is described as being changed, the relative position relationship may be changed accordingly.

Users of electronic devices such as mobile phones and tablet computers often manually adjust the display brightness of the electronic devices according to their usage habits or the change in ambient light so that they can view the contents displayed on the screen more comfortably. The way of manually adjusting the brightness of the electronic device is troublesome. In this regard, some electronic devices use light sensing elements, such as photodiodes, to sense the intensity of the ambient light, and the electronic devices automatically adjust the display brightness of the electronic devices according to the intensity of the sensed ambient light. However, the photodiode structure and the process of manufacturing the photodiode are complex, and the yield of the product is low, and thus the production cost is increased. Furthermore, the display effect is not good, and it also increases the power consumption of the electronic device.

At present, reducing the power consumption of display devices has become the development direction of display devices, especially for portable products. Low power display product would have a strong competitiveness. Low power display devices meet the users' requirement for energy saving and environmental protection. Adjusting the brightness of the display screen according to the brightness of the ambient light can reduce power consumption, save energy and protect environment.

At least one embodiment of the present disclosure provides a display device, and the display device comprises a display screen and an ambient light sensor in the display screen, and the ambient light sensor comprises a photodeformable element comprising a photodeformable material layer; and the photodeformable element is configured to deform in response to a change in ambient light to obtain output of the ambient light sensor.

The display device adjusts the brightness of the display screen by integrating the ambient light sensor into the display screen. The photodeformable material layer in the photodeformable element deforms in response to a change in ambient light to obtain the output of the ambient light sensor, and in this way, the brightness of the display screen is adjusted. The ambient light sensor has a simple structure and is easy to be made and to be combined with the display screen. The ambient light sensor can be widely used in an environment of ultraviolet light, visible light and/or infrared light according to materials used for fabricating the photodeformable material layer.

It should be noted that, the photodeformable element is configured to deform in response to a change in ambient light, and the change in ambient light comprises changes in intensity of ambient light, wavelength range of ambient light, and so on.

For example, the ambient light sensor is a switching structure, and the output of the ambient light sensor is obtained by connecting and disconnecting the circuit, and the display brightness of the display screen is adjusted according to the corresponding output. For another example, the photodeformable material layer in the ambient light sensor is deformed in response to a change in ambient light to shade the ambient light, and at the same time the corresponding information is outputted to adjust the display brightness of the display screen. The following is an example of an ambient light sensor having a switching structure.

For example, FIG. 1 is a schematic diagram of a structure of a display device in a first state provided by an embodiment of the present disclosure. As illustrated in FIG. 1, the display device comprises a display screen 101 and an ambient light sensor 102 in the display screen 101. The ambient light sensor 102 comprises a photodeformable element 103 comprising a photodeformable material layer 104, and the photodeformable element 103 is configured to deform in response to a change in ambient light to obtain output of the ambient light sensor 102. For example, in addition to the photodeformable material layer 104, the photodeformable element 103 further comprises a conducting layer 105. The photodeformable element 103 comprises a laminate of the conductive layer 105 and the photodeformable material layer 104, wherein the conducting layer 105 and the photodeformable material layer 104 are stacked and interconnected. The deformation of the photodeformable material layer 104 can lead to the deformation of the conducting layer 105 which is stacked with the photodeformable material layer 104. For example, the conducting layer 105 is configured to transmit an electrical signal.

For example, the photodeformable material layer has a thickness of from about 1 μm to 20 μm. More specifically, the thickness of the photodeformable material layer is about 5 μm, 10 μm, 15 μm or 20 μm. The conducting layer has a thickness of from about 1 μm to 10 μm. More specifically, the thickness of the conducting layer is about 2 μm, 5 μm or 10 μm and so on.

For example, the display device is configured to adjust the display brightness of the display screen according to the output of the ambient light sensor. For example, the following is illustrated by a change in the intensity of the ambient light, and no change in the wavelength range of the ambient light. The display brightness of the display screen can be adjusted in a case that the intensity of the ambient light changes, which results in deformation of the photodeformable element and a change in the information outputted from the ambient light sensor. For example, the greater the change in the intensity of the ambient light, the greater the deformation of the photodeformable element. For example, the mode of display brightness of the display screen can be adjusted according to requirement.

For example, as illustrated in FIG. 1, the display device further comprises a driving signal circuit (not illustrated in FIG. 1) and a metal wire 106, one end of the photodeformable element 103 is fixedly connected with the driving signal circuit, and the other end of the photodeformable element 103 can be deformed to electrically connect or disconnect with the metal wire 106 as the ambient light changes.

For example, as illustrated in FIG. 1, the display screen further comprises a first substrate 107, a second substrate 108, and a display element 110 disposed between the first substrate 107 and the second substrate 108. For example, the first substrate 107 is a color filter substrate and the second substrate 108 is an array substrate; or the first substrate 107 is an array substrate and the second substrate 108 is a color filter substrate; or the first substrate 107 is an array substrate and the second substrate 108 is an encapsulating cover plate.

For example, the display element 110 is a light-emitting diode (LED) element, such as an organic light-emitting diode (OLED) element. The ambient light sensor needs to be protected by a shell, and has an activity space for a movable end. Such a purpose can be conveniently achieved by encapsulating the OLED. In fact, any display element having an encapsulation space for example a liquid crystal display (LCD) element can be used, and it is not limited herein.

For example, as illustrated in FIG. 1, the display device further comprises an encapsulating layer 109 for encapsulating the first substrate 107 and the second substrate 108, and the encapsulating layer 109 is disposed between the first substrate 107 and the second substrate 108, which are disposed opposite to each other.

For example, one end of the photodeformable element 103 is fixed on the second substrate 108 and connected to a driving signal line on the second substrate 108 through a via hole structure or the like to connect with the driving circuit.

For example, in the structure illustrated in FIG. 1, in a case that there is no ambient light or the intensity of ambient light fails to meet the condition that the photodeformable element 103 is deformed to achieve circuit disconnection, one end of the photodeformable element 103 would continue to contact the metal wire 106. In this case, the information outputted from the ambient light sensor is not changed, and the display brightness of the display screen is not adjusted.

Figure 2:
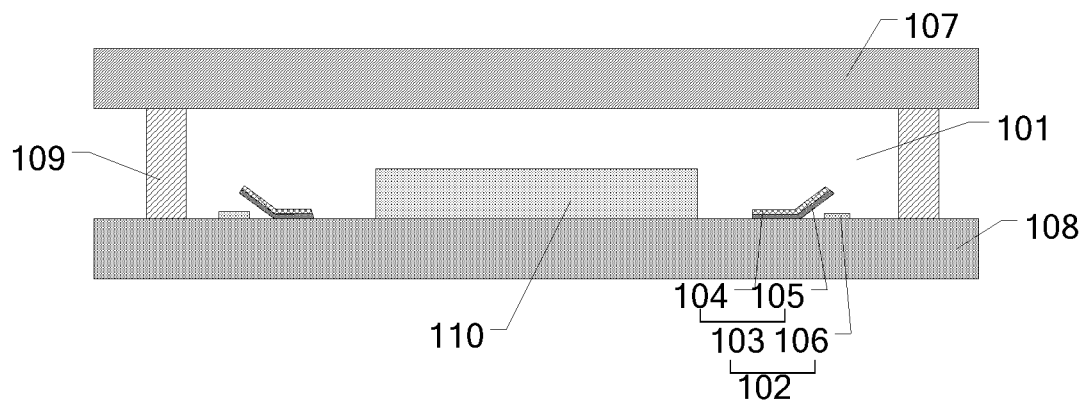
FIG. 2 is a schematic diagram of the structure of the display device of FIG. 1 in a second state.

For example, FIG. 2 is a schematic diagram of the structure of the display device of FIG. 1 in a second state. As illustrated in FIG. 2, the photodeformable element 103 senses a certain intensity of ambient light and is deformed to disconnect with the metal wire 106. In this case, the information outputted from the ambient light sensor changes, and thus the display brightness of the display screen is adjusted. According to the brightness of the ambient light, the brightness of the display screen is adjusted, which can reduce power consumption, save energy and protect environment.

For example, in FIG. 1 and FIG. 2, both the photodeformable element 103 and the metal wire 106 are arranged on the second substrate 108, and the display element 110 is also arranged on the second substrate 108.

Figure 3:
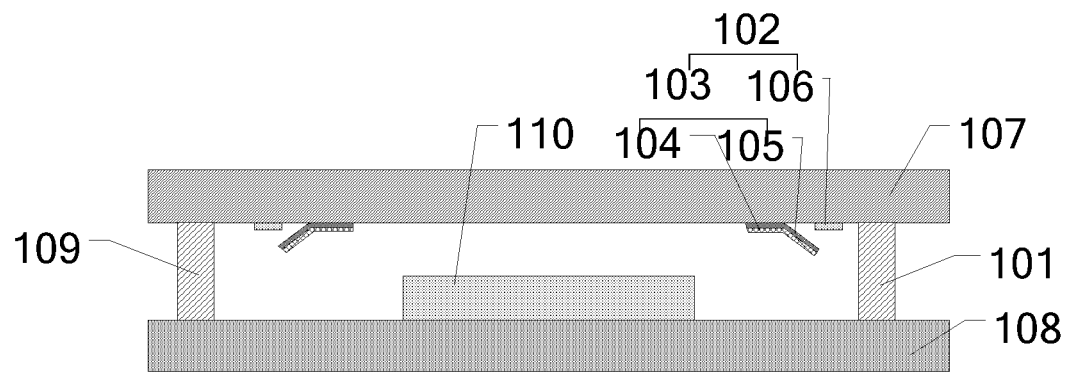
FIG. 3 is a schematic diagram of a structure of a display device provided by another embodiment of the present disclosure.

For example, FIG. 3 is a schematic diagram of a structure of a display device provided by another embodiment of the present disclosure. As illustrated in FIG. 3, both the photodeformable element 103 and the metal wire 106 are arranged on the first substrate 107, and the display element 110 is arranged on the second substrate 108. Similar to FIG. 1 and FIG. 2, the photodeformable element 103 is deformed to disconnect or connect with the metal wire 106 in a case that it senses a certain intensity of ambient light, and thereby the output of the ambient light sensor 102 is changed to achieve the adjustment of display brightness of the display screen.

It should be noted that, the "certain intensity" in "a certain intensity of ambient light" mentioned in describing FIG. 1 to FIG. 3 corresponds to the sensitivity of the photodeformable material layer to ambient light. If the photodeformable material layer is not very sensitive to ambient light and the deformation ability is weak, the "certain intensity" in "a certain intensity of ambient light" would be high. If the photodeformable material layer is very sensitive to ambient light and the deformation ability is strong, the "certain intensity" in "a certain intensity of ambient light" would be low. Therefore, "certain intensity" is not limited herein.

For example, in the structure of the display device illustrated in FIG. 1 to FIG. 3, the cross-section shape of the photodeformable element 103 is a straight line before it is deformed.

Figure 4:
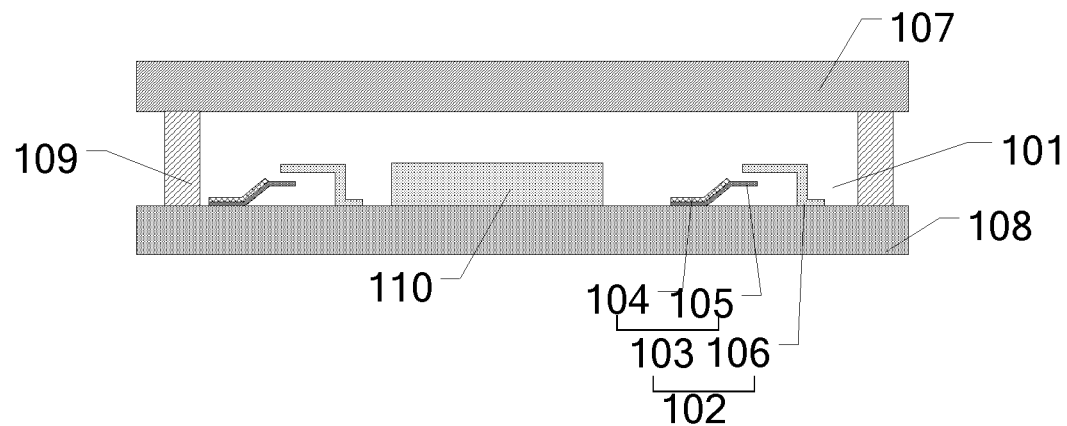
FIG. 4 is a schematic diagram of a structure of a display device provided by still another embodiment of the present disclosure.

For example, FIG. 4 is a schematic diagram of a structure of a display device provided by another embodiment of the present disclosure. As illustrated in FIG. 4, before the photodeformable element 103 is deformed, the cross-section shape of the photodeformable element 103 is a folded line, and the shape of the corresponding metal wire 106 is also a folded line. In FIG. 4, the photodeformable element 103 and the metal wire 106 are in a state of disconnection. The folded line in the photodeformable element 103 extends upward in a ladder shape, and the metal wire 106 also extends upward in a ladder shape, so that the photodeformable element 103 can be well connected with the metal wire 106 after deformation.

Figure 5:
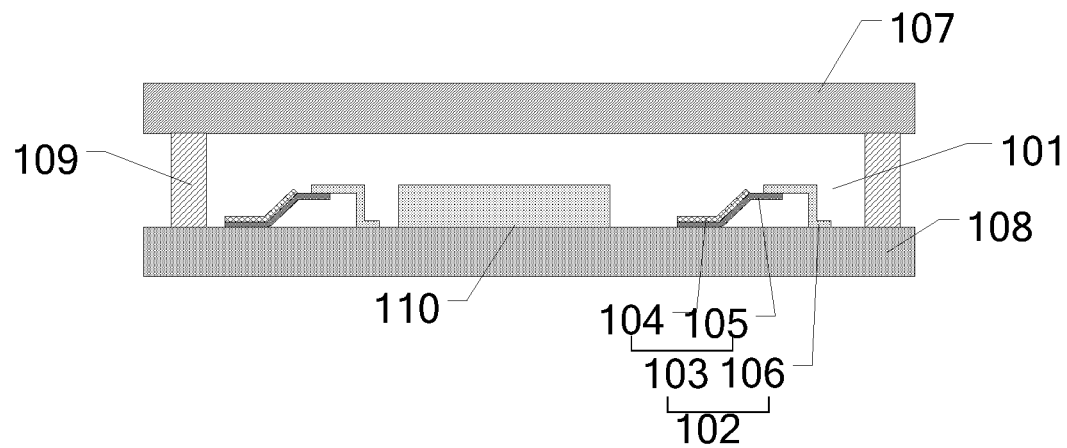
FIG. 5 is a schematic diagram of the structure of the display device of FIG. 4 in another state.

For example, FIG. 5 is a schematic diagram of the structure of the display device of FIG. 4 in another state. In a case that the photodeformable element 103 senses a certain intensity of ambient light and deforms, it can be electrically connected with the metal wire 106, thereby changing the output of the ambient light sensor 102 to realize the adjustment of display brightness of the display screen.

It should be noted that, the cross-section shape of the deformed photodeformable element 103 can be a folded line, an arc shape, a zigzag shape, or a combination of the folded line and the arc shape, and so on. The cross-section shape of the photodeformable element 103 is not limited herein.

Figure 6:
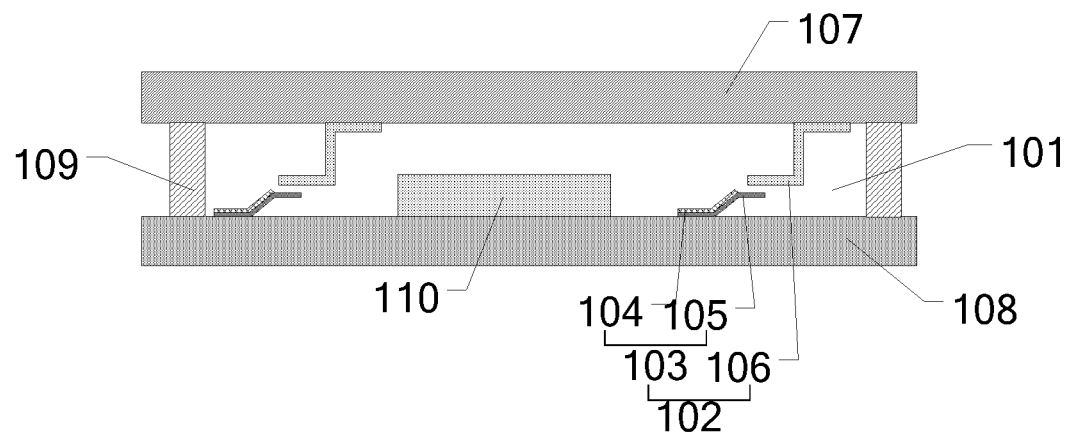
FIG. 6 is a schematic diagram of a display device provided by another embodiment of the present disclosure.

For example, one of the photodeformable element 103 and the metal wire 106 may be arranged on the first substrate 107 and the other may be arranged on the second substrate 108. FIG. 6 is a schematic diagram of a display device provided by another embodiment of the present disclosure. As illustrated in FIG. 6, the photodeformable element 103 is arranged on the second substrate 108, and the metal wire 106 is arranged on the first substrate 107. Alternatively, the photodeformable element 103 may be arranged on the first substrate 107, and the metal wire 106 may be arranged on the second substrate 108.

It should be noted that, the "certain intensity" in "a certain intensity of ambient light" mentioned in describing FIG. 4 to FIG. 6 corresponds to the sensitivity of the photodeformable material layer to ambient light, and a distance between the photodeformable element 103 and the metal wire 106 in a disconnection state in a first direction in which the photodeformable element 103 deforms and extends. If the photodeformable material layer is not very sensitive to ambient light and the deformation ability is weak, and the distance between the photodeformable element 103 and the metal wire 106 in the first direction is long, the "certain intensity" in "a certain intensity of ambient light" would be high. If the photodeformable material layer is very sensitive to ambient light and the deformation ability is strong, and the distance between the photodeformable element 103 and the metal wire 106 in the first direction is short, the "certain intensity" in "a certain intensity of ambient light" would be low. Therefore, "certain intensity" is not limited herein.

For example, the display device provided in the embodiments of the present disclosure may further comprise a signal acquisition circuit connected with the metal wire. The signal acquisition circuit is configured to acquire information outputted from the ambient light sensor. The signal acquisition circuit can acquire the information outputted from the ambient light sensor in a constant period interval. Alternatively, the period interval may be varied according to requirement. Therefore, it is not limited herein.

For example, the information outputted from the ambient light sensor may comprise a voltage signal or a current signal outputted from the ambient light sensor. For example, for FIG. 1 and FIG. 2, in a case that the detected voltage signal (or current signal) in the first state corresponding to FIG. 1 is different from the detected voltage signal (or current signal) in the second state corresponding to FIG. 2, the output of the ambient light sensor 102 would be changed, for example, for realizing the adjustment of the display brightness of the display screen.

For example, the display further comprises a controller. For example, the controller is configured to receive the information outputted from the ambient light sensor, and to control display brightness of the display screen. For example, the controller is a central processing unit, a microprocessor, or a programmable logic controller, etc. It can be used to execute computational codes or instructions to achieve the corresponding functions.

For example, the controller is configured to adjust the brightness of the display screen according to a piecewise function. For example, the piecewise function is a first function:

$$f(x) = \{1_{(x \geq m)}{}^{0(x<m)},$$

or a second function:

$$f(x) = \{0_{(x \geq m)}{}^{1(x<m)}.$$

In which, x is the intensity of ambient light, and m is a critical value of the intensity of ambient light for deforming the photodeformable material layer to achieve electrical connection or disconnection.

For example, the value 0 refers to electrical connection, and the value 1 refers to disconnection. In a case that the intensity of ambient light is less than m, the photodeformable element 103 is electrically connected to the metal wire 106, and the ambient light sensor outputs information of a first state, and the controller receives the information outputted from the ambient light sensor and controls the display brightness of the display device corresponding to the first state. In a case that the intensity of ambient light is greater than or equal to m, the photodeformable element 103 and the metal wire 106 are in a state of disconnection, and the ambient light sensor outputs information of a second state, and the controller receives the information outputted from the ambient light sensor and controls the display brightness of the display device corresponding to the second state. Herein the display brightness of the second state is greater than the display brightness of the first state, and the structures illustrated in FIG. 1 to FIG. 3 adopt the output mode of the first function.

For example, the value 0 refers to electrical connection, and the value 1 refers to disconnection. In a case that the intensity of ambient light is less than m, the photodeformable element 103 is disconnected to the metal wire 106, and the ambient light sensor outputs information of a first state, and the controller receives the information outputted from the ambient light sensor and controls the display brightness of the display device corresponding to the first state. In a case that the intensity of ambient light is greater than or equal to m, the photodeformable element 103 is connected to the metal wire 106, and the ambient light sensor outputs information of a second state, and the controller receives the information outputted from the ambient light sensor and controls the display brightness of the display device corresponding to the second state. Herein the display brightness of the second state is greater than the display brightness of the first state, and the structures illustrated in FIG. 4 to FIG. 6 adopt the output mode of the second function.

For example, the photodeformable element is sensitive to at least one of ultraviolet light, visible light and infrared light and deforms according to various materials of the photodeformable material layer.

For example, in a case that the photodeformable element is sensitive to ultraviolet light, the photodeformable material layer comprises a photodeformable liquid crystal elastomer having an azobenzene photoresponsive group. For example, in a case that the photodeformable element is sensitive to visible light, the photodeformable material layer comprises a liquid crystal polymer having an azotolane long conjugated group. For example, in a case that the photodeformable element is photosensitive to infrared light, the photodeformable material layer comprises a composite material of an azobenzene liquid crystalline polymer and rare earth luminescent nanoparticles.

For example, the principle that the photodeformable liquid crystal elastomer having an azobenzene photoresponsive group deforms is as follows: the liquid crystal elastomer has the characteristics of anisotropic arrangement and coordinated motion. Under external field stimulation, a change from liquid crystal phase to isotropic phase occurs, and the arrangement of molecules is changed from order to disorder. In the liquid crystal system containing azobenzene, trans-azobenzene exhibits a thermodynamically stable conformation with a rod-like structure which is similar to the shape of liquid crystal, and has a stabilizing effect on the whole liquid crystal system. The cis-azobenzene formed by photoisomerization has a bending structure, which tends to disorder the whole liquid crystal system. Therefore, under ultraviolet light, in a case that azobenzene undergoes trans-to-cis photoisomerization, the coordinated movement of the liquid crystal units leads to disorder of some liquid crystal units in the arrangement direction, which results in the transformation from a liquid crystalline phase to an isotropic phase, and the change in molecular orientation further causes anisotropic macroscopic deformation of the entire polymer network.

It should be noted that, the liquid crystal elastomer is a polymer which is obtained by moderately crosslinking a non-crosslinked liquid crystal polymer and exhibits elasticity in isotropic or in a liquid crystal state. The liquid crystal elastomer combines the anisotropy of liquid crystal and the rubbery elasticity of polymer network. It has good properties of external field responsiveness, molecular synergy and elasticity. Liquid crystal elastomer can change its shape by changing the arrangement of mesogenic units under the stimulation of external field (electric field, temperature, light, etc.).

For example, the principle of the liquid crystal polymer having an azotolane long conjugated group which is sensitive to visible light, and the principle of the composite material of an azobenzene liquid crystal polymer and rare earth luminescent nanoparticles which is sensitive to infrared light can refer to the related descriptions for the photodeformable liquid crystal elastomer having an azobenzene photoresponsive group mentioned above. Therefore, they are omitted herein.

For example, the conducting layer may be a metal layer, and the conducting layer may be made of copper or copper alloy, nickel or nickel alloy, aluminum or aluminum alloy, etc.

For example, at least one embodiment of the present disclosure further provides a method for adjusting display brightness of a display screen of a display device, and the method comprises: sensing ambient light by a photodeformable element in an ambient light sensor, wherein a photodeformable material layer in the photodeformable element is deformed in response to a change in ambient light to obtain output of the ambient light sensor; and adjusting display brightness of the display screen in the display device according to the output of the ambient light sensor.

For example, the ambient light sensor is a switching structure, and the display brightness of the display screen is adjusted by connecting and disconnecting the circuit. For another example, the photodeformable material layer in the ambient light sensor is deformed in response to a change in ambient light to shade the ambient light, and at the same time the corresponding information is outputted for adjusting the display brightness of the display screen.

The following is an example of an ambient light sensor which has a switching structure.

Figure 7:
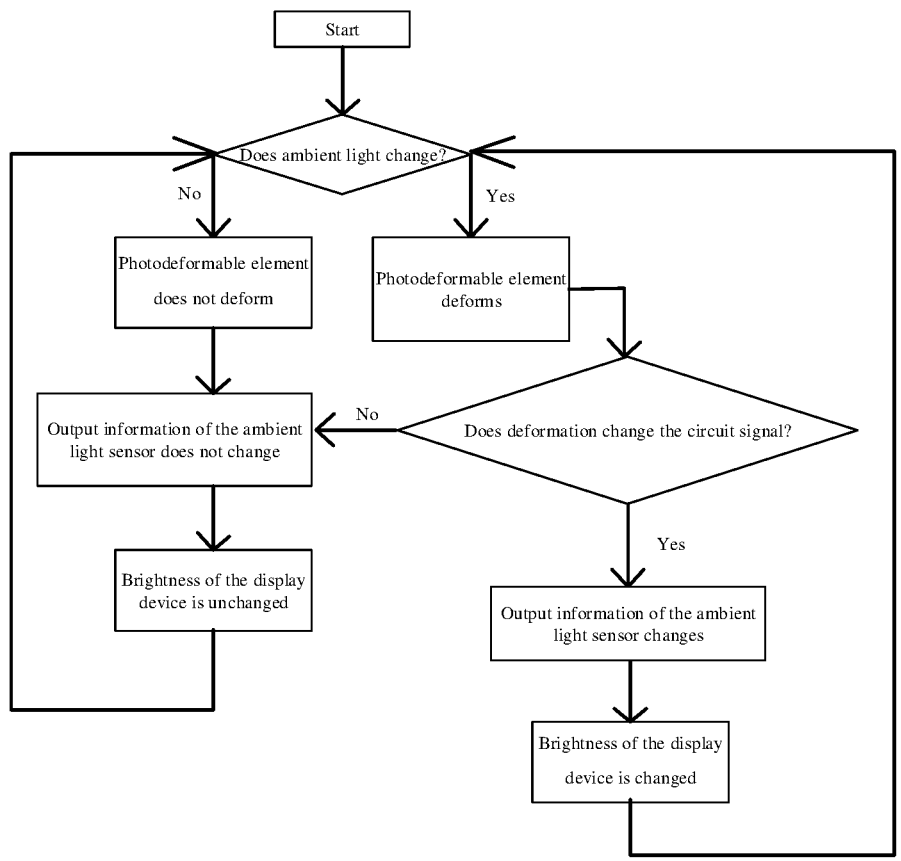
FIG. 7 is a flowchart of a method for adjusting display brightness of a display device provided by an embodiment of the present disclosure.

For example, FIG. 7 is a flowchart of a method for adjusting display brightness of a display device provided by an embodiment of the present disclosure. For FIG. 7, the following three situations are illustrated by changing the intensity of the ambient light, and not changing the wavelength range of the ambient light:

(1) in a case that the change in the intensity of the ambient light results in the deformation of the photodeformable element and the information outputted from the ambient light sensor changes, the display brightness of the display screen would be adjusted;

(2) in a case that the change in the intensity of the ambient light results in the deformation of the photodeformable element and the information outputted from the ambient light sensor does not change, the display brightness of the display screen would not be adjusted; and (3) in a case that the change in the intensity of the ambient light does not result in the deformation of the photodeformable element, and the information outputted from the ambient light sensor does not change, the display brightness of the display screen would not be adjusted.

For example, the photodeformable element may further comprise a conducting layer which is laminated and connected with the photodeformable material layer, and deformation of the photodeformable material layer causes deformation of the conducting layer, so that the output of the ambient light sensor is obtained.

For example, the photodeformable element may further comprise a driving signal circuit and a metal wire, and one end of the photodeformable element is fixedly connected to the driving signal circuit, and the other end of the photodeformable element is deformed in response to a change in ambient light to electrically connect or disconnect with the metal wire for obtaining the output of the ambient light sensor.

For example, the photodeformable element is electrically connected with the metal wire in a case that the photodeformable element senses the ambient light and deforms, or the photodeformable element is disconnected with the metal wire in a case that the photodeformable element senses the ambient light and deforms.

In the embodiments of the present disclosure, the ambient light sensor is disposed in the display device, and the display brightness of the display screen can be appropriately adjusted according to the output of the ambient light sensor. In this way, the display region becomes brighter under strong ambient light, and becomes darker under weak ambient light. The ambient light sensor comprises a photodeformable element, and the photodeformable element comprises a photodeformable material layer. According to the different materials of the photodeformable material layer, the photodeformable element can be sensitive to ultraviolet light, visible light and/or infrared light and be deformed. For example, in a case that the photodeformable element may further comprise a conducting layer, deformation of the photodeformable material layer causes deformation of the conducting layer which is connected with the photodeformable material layer, and thus the circuit signal is changed with the ambient light, and the changed circuit signal is output. Compared with the complex structure of photoelectric sensor such as photodiode integrated in display device, the ambient light sensor has a simple structure and can be easily combined with the display screen. It can be widely used in the environment of ultraviolet light, visible light and/or infrared light.

For example, the display device in the embodiments of the present disclosure may be applied in various display apparatus, such as: a liquid crystal panel, an electronic paper, an OLED panel, a mobile phone, a tablet computer, a television, a monitor, a notebook computer, a digital photo frame, a navigator, and any other products or components having a display function.

The display device and the method for adjusting display brightness of the display device provided by the embodiments of the present disclosure have at least one of the following beneficial effects:

(1) in the display device provided by at least one embodiment of the present disclosure, the ambient light sensor is integrated into the display screen, and the photodeformable material layer in the photodeformable element deforms in response to a change in ambient light to obtain the output of the ambient light sensor, thereby adjusting the brightness of the display screen;

(2) in the display device provided by at least one embodiment of the present disclosure, the ambient light sensor has a simple structure and its manufacturing process is simple;

(3) in the display device provided by at least one embodiment of the present disclosure, the ambient light sensor can be easily combined with the display screen, and can be widely used in an environment of ultraviolet light, visible light and/or infrared light according to materials for fabricating the photodeformable material layer; and (4) in the display device provided by at least one embodiment of the present disclosure, adjusting the brightness of the display screen according to the brightness of the ambient light can reduce power consumption, save energy and protect environment.

Please note that:

(1) the drawings of the present disclosure are only related to the structures mentioned in the embodiments of the present disclosure, and other structures can be further obtained by general designs;

(2) for the sake of clarity, sizes of layers or regions in the drawings for describing the embodiments of the present disclosure are not drawn according to an actual scale but are exaggerated or diminished; it is understood that in a case that an element such as a layer, membrane, region, or substrate is referred to as being located "on" or "below" another element, the element may be "directly" located "on" or "below" another element, or intermediate element(s) may exist therebetween; and (3) the embodiments of the present disclosure and the features therein can be combined with each other in the absence of conflict.

What is described above is related to only the illustrative embodiments of the disclosure and not limitative to the scope of the disclosure. The scopes of the disclosure are defined by the accompanying claims.

What is claimed is:
1. A display device, comprising:
a display screen; and
an ambient light sensor in the display screen;
wherein the ambient light sensor comprises a photodeformable element comprising a photodeformable material layer; and
the photodeformable element is configured to deform in response to a change in ambient light to obtain output of the ambient light sensor;
the display device is configured to adjust display brightness of the display screen according to the output of the ambient light sensor;
the display device further comprises a driving signal circuit and a metal wire, wherein one end of the photodeformable element is connected with the driving signal circuit, and the other end of the photodeformable element is deformed to electrically connect or disconnect with the metal wire in response to the change in ambient light.

2. The display device according to claim 1, wherein the photodeformable element further comprises a conducting layer which is configured to transmit an electrical signal, and the photodeformable element is a laminate of the conducting layer and the photodeformable material layer.

3. The display device according to claim 1, wherein:
the photodeformable element is electrically connected with the metal wire in a case that the photodeformable element senses the ambient light and deforms, or
the photodeformable element is disconnected with the metal wire in a case that the photodeformable element senses the ambient light and deforms.

4. The display device according to claim 3, further comprising a signal acquisition circuit, wherein the signal acquisition circuit is connected with the metal wire, and configured to acquire information outputted from the ambient light sensor.

5. The display device according to claim 4, further comprising a controller, wherein the controller is configured to receive the information outputted from the ambient light sensor, and to control display brightness of the display screen.

6. The display device according to claim 5, wherein the controller is configured to adjust the display brightness of the display screen according to a piecewise function.

7. The display device according to claim 1, wherein the display screen comprises a first substrate and a second substrate, and
both the ambient light sensor and the metal wire are arranged on the first substrate or the second substrate, or one of the ambient light sensor and the metal wire is arranged on the first substrate and the other is arranged on the second substrate.

8. The display device according to claim 1, wherein the photodeformable element is deformed in response to at least one of ultraviolet light, visible light and infrared light.

9. The display device according to claim 8, wherein the photodeformable element is sensitive to ultraviolet light, and the photodeformable material layer comprises a photodeformable liquid crystal elastomer having an azobenzene photoresponsive group.

10. The display device according to claim 8, wherein the photodeformable element is sensitive to visible light, and the photodeformable material layer comprises a liquid crystal polymer having an azotolane long conjugated group.

11. The display device according to claim 8, wherein the photodeformable element is sensitive to infrared light, and the photodeformable material layer comprises a composite material of an azobenzene liquid crystal polymer and rare earth luminescent nanoparticles.

12. The display device according to claim 2, wherein the display device is configured to adjust display brightness of the display screen according to the output of the ambient light sensor.

13. The display device according to claim 12, further comprising a driving signal circuit and a metal wire, wherein one end of the photodeformable element is connected with the driving signal circuit, and the other end of the photodeformable element is deformed to electrically connect or disconnect with the metal wire in response to the change in ambient light.

14. The display device according to claim 13, wherein:
the photodeformable element is electrically connected with the metal wire in a case that the photodeformable element senses the ambient light and deforms, or
the photodeformable element is disconnected with the metal wire in a case that the photodeformable element senses the ambient light and deforms.

15. A method for adjusting display brightness of a display device, comprising:
sensing ambient light by a photodeformable element in an ambient light sensor, wherein the photodeformable element has a photodeformable material layer which is deformed in response to a change in ambient light to obtain output of the ambient light sensor; and
adjusting display brightness of a display screen in the display device according to the output of the ambient light sensor;
wherein the display device further comprises a driving signal circuit and a metal wire; and one end of the photodeformable element is fixedly connected to the driving signal circuit, and the other end of the photodeformable element is deformed in response to the change in ambient light to electrically connect or disconnect with the metal wire for obtaining the output of the ambient light sensor.

16. The method according to claim 15, wherein the photodeformable element further comprises a conducting layer which is laminated and connected with the photodeformable material layer, and deformation of the photodeformable material layer causes deformation of the conducting layer so that the output of the ambient light sensor is obtained.

17. The method according to claim 15, wherein:
the photodeformable element is electrically connected with the metal wire in a case that the photodeformable element senses the ambient light and deforms, or
the photodeformable element is disconnected with the metal wire in a case that the photodeformable element senses the ambient light and deforms.

* * * * *